Nov. 10, 1931.  H. F. FLOWERS  1,831,489
THREE-WAY DUMP VEHICLE
Filed Feb. 9, 1928   5 Sheets-Sheet 1
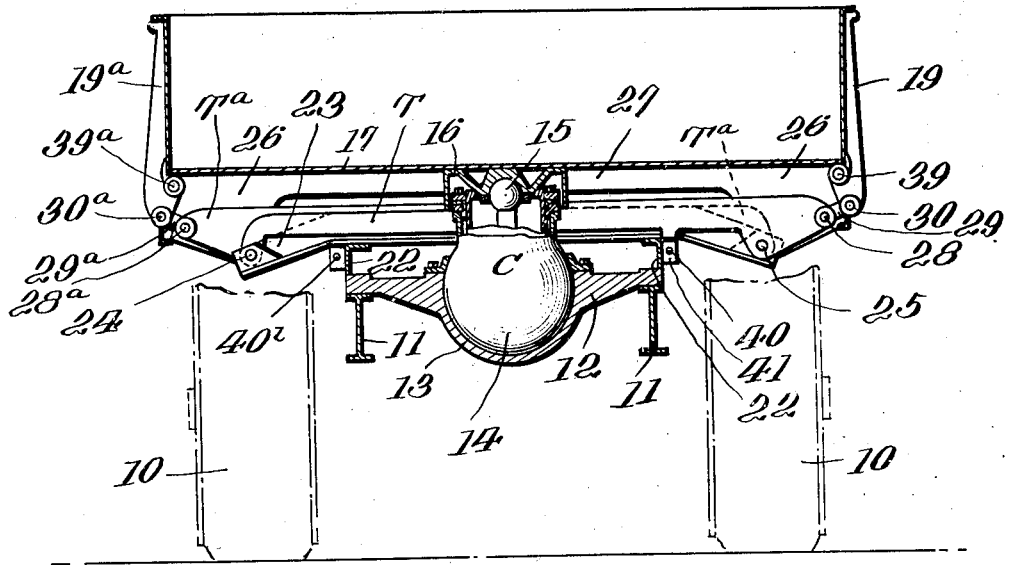
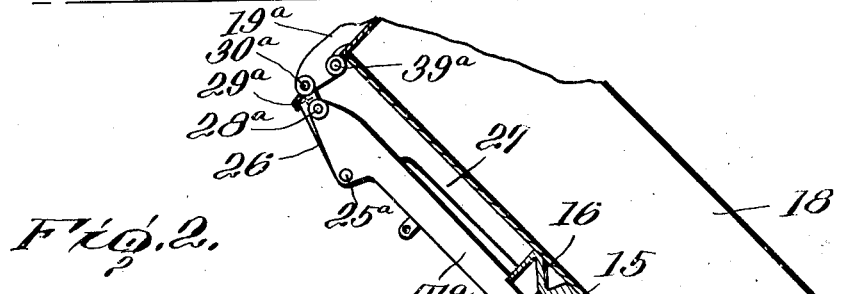
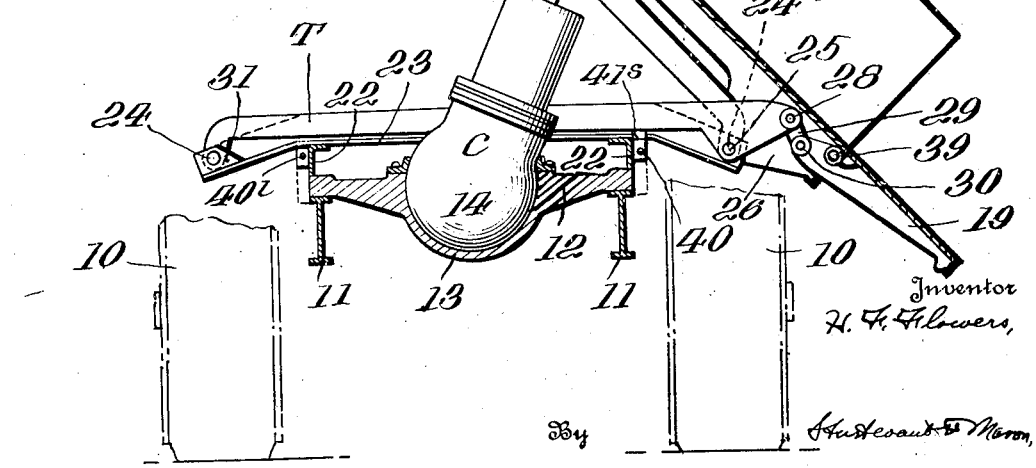

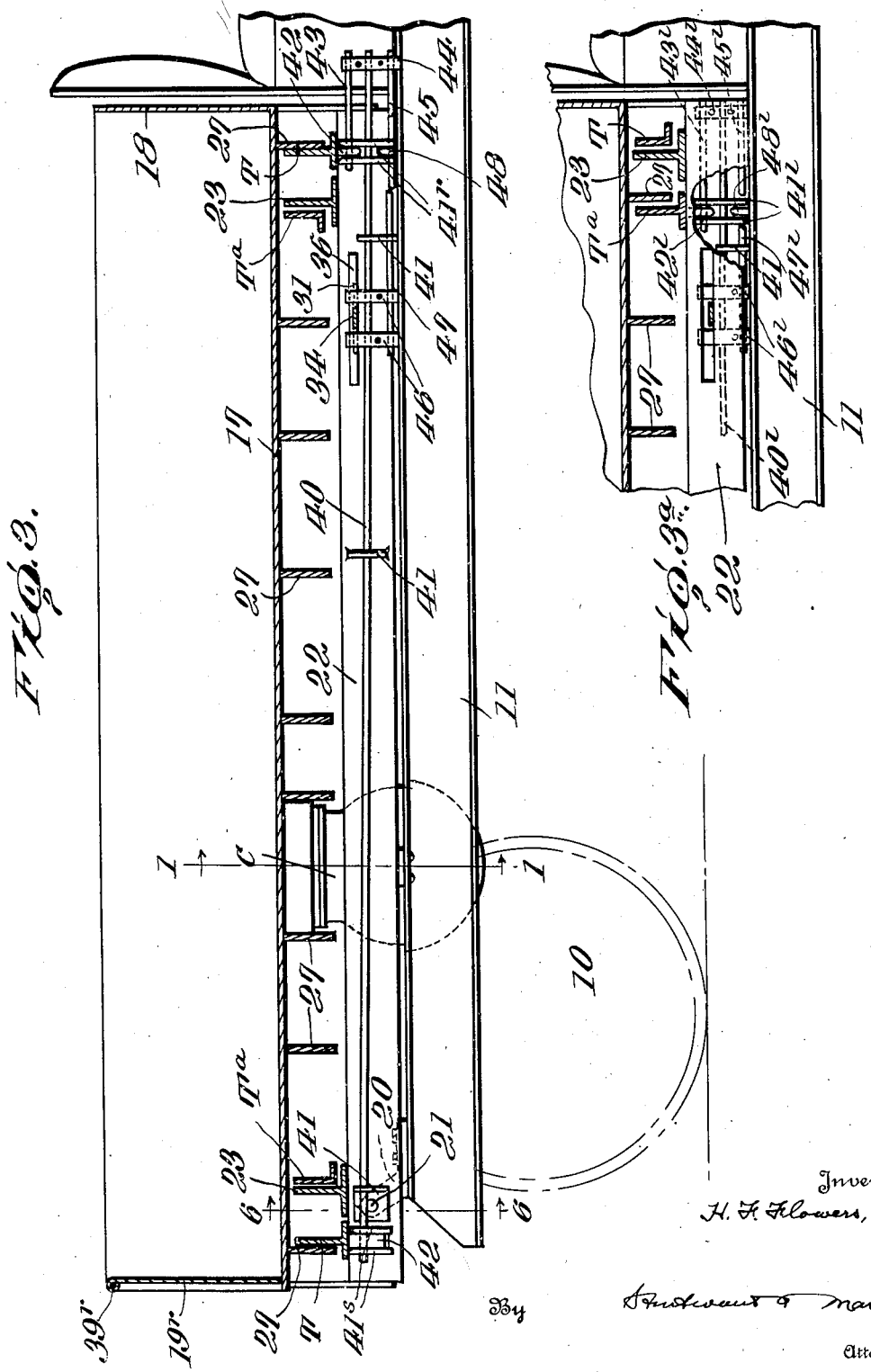

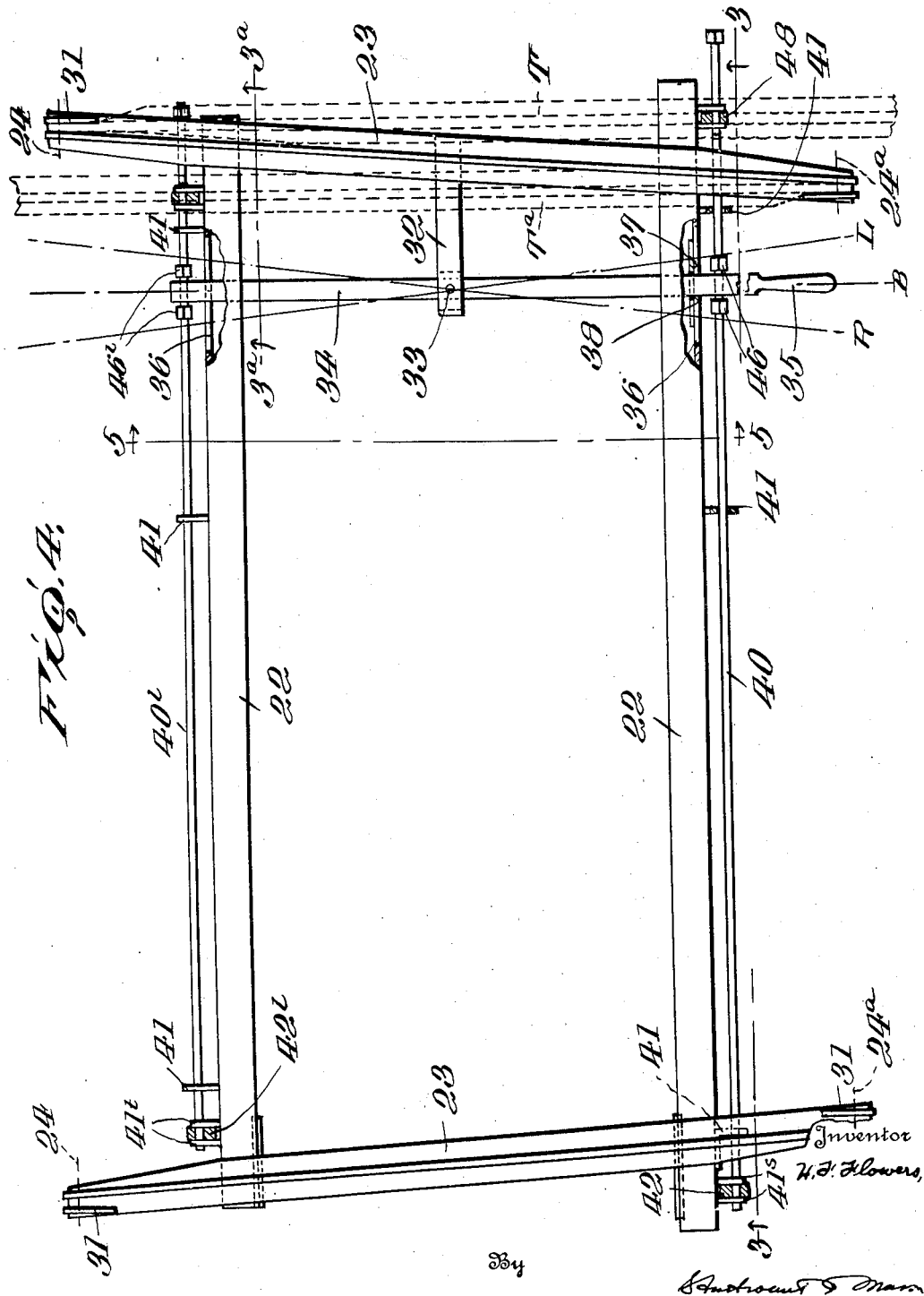

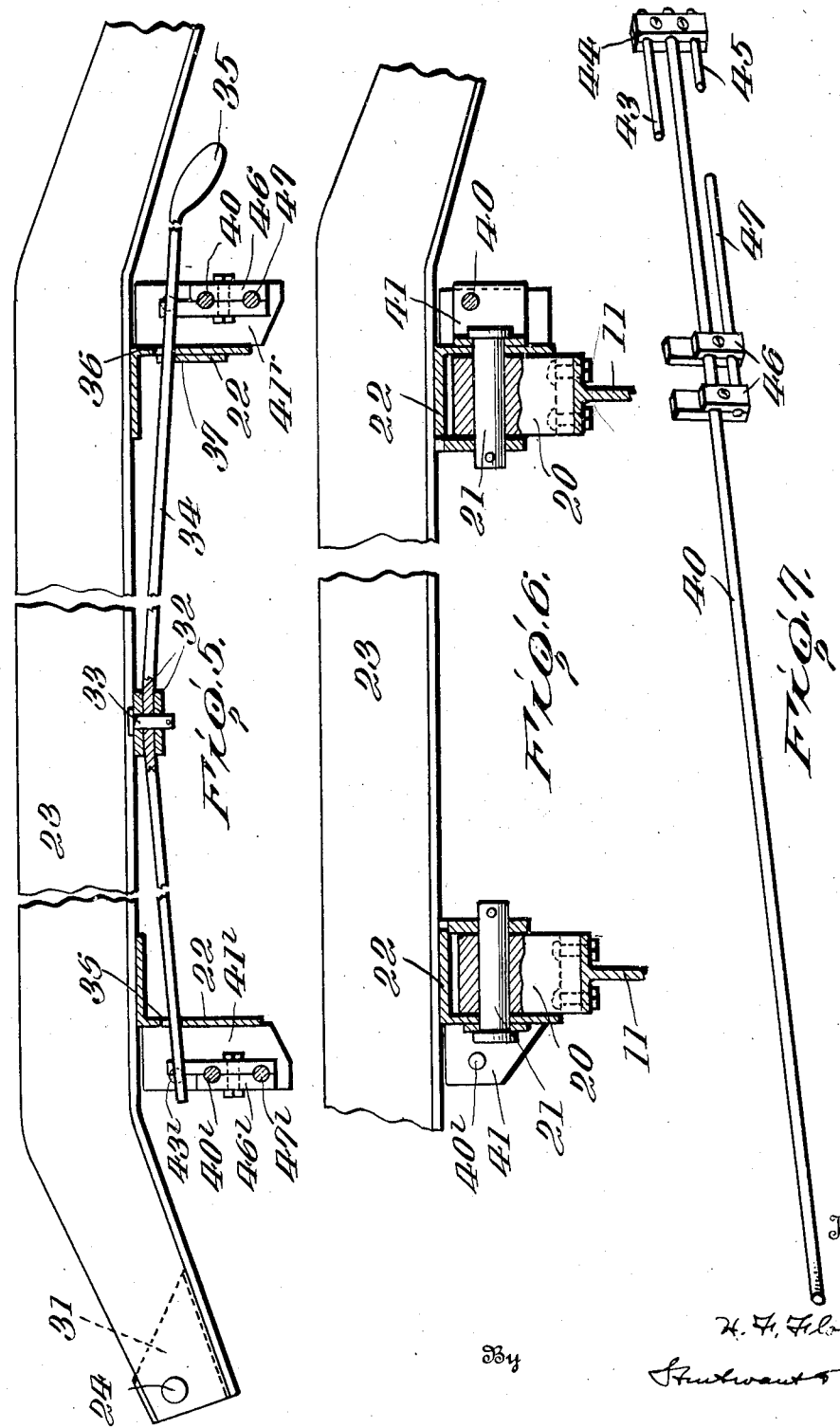

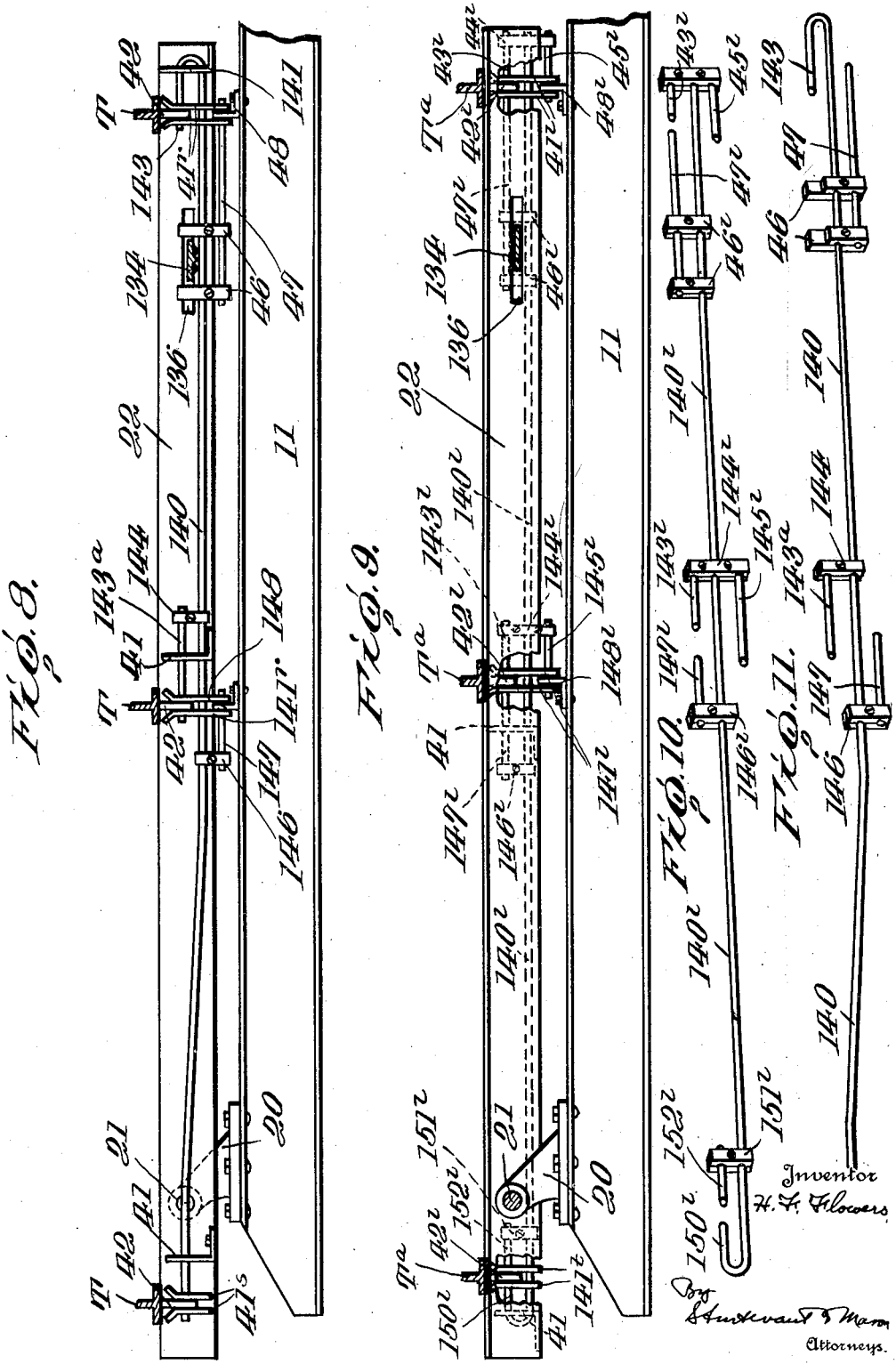

Patented Nov. 10, 1931

1,831,489

UNITED STATES PATENT OFFICE

HENRY FORT FLOWERS, OF FINDLAY, OHIO

THREE WAY DUMP VEHICLE

Application filed February 9, 1928. Serial No. 253,104.

This invention relates to improvements in dump vehicles, and more especially to the controlling mechanisms which regulate the direction of dumping of vehicles having bodies competent to dump in various directions.

According to the present invention, a dump vehicle is provided with a main frame upon which a dump body is supported in such manner that it can tilt for dumping. A power mechanism is provided to cause the tilting of the body, and a latch system is employed to control the relationship of the body and frame to determine the direction in which dumping is to be effected.

One of the objects of this invention is, therefore, to provide a latch system for dump vehicles which interlocks the various parts of the frame and body so that dumping may occur in the selected direction.

A further feature of the invention is the provision of a system of a type which in itself constitutes an interlock so that the direction of dumping is positively controlled.

Still another object of the invention is the provision of a dumping system which is peculiarly adapted for employment with a three-way dump vehicle, and which in its three several positions respectively and positively controls the dumping to one or the other side or to the rear.

Still another object of the invention is to provide a latch system which is competent to cooperate with a sub-frame which is pivoted at the rear of the main frame, and upon which is mounted a body adapted to tilt about fulcrums at either side of the sub-frame: the latch system serving to release the sub-frame from the main frame or to secure it thereto, and to selectively secure the dump body to the sub-frame so that it may only be moved by tilting in a given direction with respect to the main frame.

With these and other objects in view as will appear in the course of the following specification and claims taken in conjunction with the accompanying drawings, I have illustrated on these drawings two forms of execution of the underlying principles of this invention as setting forth means by which it may be practiced in conjunction with a three-way-dumping road vehicle.

In these drawings:

Figure 1 is a transverse sectional view through a vehicle body constructed according to the present invention, the section being taken substantially on line 1—1 of Fig. 3, and showing the body in the lowered or transport position.

Fig. 2 is a corresponding section, but with the body in the tilted position for dumping to the side at the right.

Fig. 3 is a longitudinal sectional view of the vehicle substantially on line 3—3 of Fig. 4, showing the body in the lowered position, and indicating one position of the right-hand latches.

Fig. 3a is a fragmentary horizontal sectional view, substantially on line 3a—3a of Fig. 4.

Fig. 4 is a horizontal diagrammatic view showing the latch rods and sub-frame, the body and transverse arms being removed.

Fig. 5 is a transverse sectional view on a larger scale, taken substantially on line 5—5 of Fig. 4.

Fig. 6 is a similar section taken on line 6—6 of Fig. 3.

Fig. 7 is a perspective view showing an end of the latch rod on an enlarged scale.

Fig. 8 is a modified form in diagrammatic side elevation similar to Fig. 3 of the frame, sub-frame, body and the right hand latch rod.

Fig. 9 is a sectional view of this modified form, similar to Fig. 3a, with portions broken away to show the same elements as in Fig. 8, but with the latch rod for the left hand side of the vehicle.

Fig. 10 is a perspective view of the latch rod used at the left hand side in Fig. 9.

Fig. 11 is a similar perspective view of the latch rod for the right-hand side in Fig. 8.

According to the present invention, and in the illustrative form shown on the drawings, a vehicle is shown as having the wheels 10, 10 which are provided with the usual suspensions (not shown) to support a main frame including the longitudinal members 11, and cross members to stiffen the same. One of these cross members 12 is constructed and arranged to constitute a socket 13 to receive the lower ball 14 of a raising device or power unit indicated generally by the reference character C, which may be of any suitable type and provided, for example, with an upper ball 15 to exert a thrust against a bearing member 16 which is supported on the floor 17 of the body proper which has the front end member 18 and the side doors 19, 19a. It will be understood that the frame, power unit and associated parts are merely represented conventionally to show a transportable supporting frame with a body mounted thereon for tilting movement in three directions, to-wit: to the rear and to either side, and in which the tilting is to be produced by a power unit C.

In the specific illustration the longitudinal frame members 11 are provided at their rear with brackets 20 which extend upwardly therefrom and carry the pivots 21 upon which are mounted the longitudinal members 22 of a sub-frame. This sub-frame likewise has the transverse angle iron members 23 which are secured to these longitudinal members 22 and are themselves bent slightly downward at their outer ends which project beyond the longitudinal irons 22. At the outer ends the transverse members 23 are provided with respective pivots 24, 24a to engage the transverse arms T, Ta. These arms are therefore alternately connected at opposite sides of the sub-frame: and each is provided at its other end with a pivot 25, 25a to connect the respective arm to a downwardly extending gusset plate 26 forming part of a transverse stiffening member 27 for the vehicle bottom 17. At the extreme end of the respective arm T or Ta, it is provided with a further pivot 28 or 28a connecting it with a short link 29 or 29a which in turn is connected by a pivot 30 or 30a to a depending portion on the respective side door 19 or 19a. It is preferred to provide stiffening brackets 31 at the ends of the transverse members 23 to support the pivots 24, 24a respectively.

Rigidly mounted on one of the transverse members 23 is the bracket 32 which carries a pivot 33 adjacent one end to support a transverse lever 34 which extends across the frame of the vehicle and carries a handle 35 at one end for easy maneuverability. As shown in Fig. 5, this lever 34 passes through slots 36 in the respective longitudinal sub-frame members 22 and is guided thereby. If desired, a reinforcing plate 37 may be affixed to the longitudinal beam 22 of the sub-frame adjacent the handle end of the lever 34. The longitudinal member 22 or the plate 37 is provided with a notch 38 into which the lever 34 may drop when at approximately the middle of its rocking movement, for a purpose which will be explained hereinafter.

At the right hand side of the vehicle, as shown in Fig. 2, and being the lower side of the frame in Fig. 4, is disposed a longitudinally slidable latch rod 40 which is guided in the brackets 41 for its longitudinal sliding movement. The rear transverse arm T is provided with a downwardly extending lug 42 in the line of movement of the rear end of the right hand latch rod 40. The forward transverse arm T likewise carries a lug 42 in the path of movement of a pin 43 which is carried by a clamp 44 rigidly fastened to the forward end of the right hand latch rod 40. The longitudinal member 22 of the sub-frame is likewise provided with the guide members 41r which are spaced apart to receive the lug 42 of the forward transverse bar T, and are perforated to guide the pin 43. Each of the lugs 42 is perforated in the line of movement of the latch rod 40 or the pin 43 when the body is in its lowered or normal transport position.

The clamp 44 likewise supports a pin 45 which is adapted upon a proper longitudinal movement of the right hand latch rod 40 to move through apertures in the lower ends of the guide plates 41r. Further clamp members 46 are provided on the latch rod 40 intermediate its length but adjacent the front end of this rod to support a pin 47 which is guided in one of the brackets 41 of the sub-frame member 22, and likewise is adapted upon proper longitudinal movement of the latch rod 40 to pass through the lower apertures of the plates 41r. The main frame 11 carries a lug 48 which is received between the plates 41r and is provided with an aperture which alines with the apertures in the lower ends of the latter when the body is in the transport position to receive one or the other of the pins 45 or 47 when the latch rod 40 has been moved to its full extent in one or the other direction: while both are disengaged therefrom when the latch rod 40 is in its intermediate position, but it will be noted that in such intermediate position (that of Fig. 3) the pin 43 yet remains engaged with the lug 42 of the front transverse bar T. The lug 42 of the rear transverse arm T is received between the plates 41ˢ of the longitudinal member 22 of the sub-frame.

At the left hand side of the vehicle, being the upper part of Fig. 4, a similar left hand latch rod 40¹ is provided which is likewise guided in the brackets 41 of the other frame member 22 for longitudinal movement. In Fig. 3a it will be seen that the rod 40¹ carries at its forward end a clamp 44¹ supporting the pins 43¹ and 45¹ which are adapted for sliding movement into and out of the alined apertures of the side plates 41¹ mounted on the longitudinal sub-frame member 22, and the apertured lug 48¹ of the main frame member 11. The front transverse bar Ta likewise carries an apertured downwardly extending lug 42¹ to be received between these side plates 41¹ for engagement by the pin $43^1$. The rod $40^1$ likewise carries the clamp members $46^1$ to support the pin $47^1$. At the rear end the rod $40^1$ is slidable through the apertured side plates $41t$ which receive the apertured lug $42^1$ of the rear transverse arm $Ta$.

The lever 34 extends at either side between the upper ends of the clamping members 46 and $46^1$, so that when the lever is rocked between the respective positions L, B and R of Fig. 4, the ends of the lever cause the respective latch rods 40, $40^1$ to move simultaneously and to a proportionate extent therewith, but it will be noted that the movements of the rods occur in opposite directions.

When the lever 34 is in the position R of Fig. 4, the latch rod 40 is moved to its full extent toward the left and the latch rod $40^1$ is moved to its full extent toward the right. The latch rod 40 is then engaged in the lug 42 of the rear arm T and its pin 43 is engaged in the similar lug 42 of the front arm T, so that the sub-frame members 22 are fixedly locked to the transverse arms T; at the same time the pin 45 of the rod system 40, 44 is engaged in the lug 48, so that the sub-frame member 22 is likewise locked to the main frame member 11. The latch rod $40^1$ on the other hand by its movement toward the right has been released from the downwardly extending lug $42^1$ of the transverse arm $Ta$ and likewise its pin $43^1$ has been released from the lug $42^1$ of the front arm $Ta$; while the pin $47^1$ of the rod $40^1$ has been engaged in the lug $48^1$ of the main frame member 11. In this way, the transverse arms $Ta$ are released for rotation on the sub-frame member 22, while the sub-frame member 22 itself is locked to the main frame member 11. It will be noted therefore that the sub-frame and main frame are locked together so that no relative movement between them can be produced by the power unit C upon actuation: that the transverse arms T are locked against rocking with respect to the sub-frame and hence to the main frame, while the transverse arms $Ta$ are free to rock. It is therefore clear that upon actuation of the power unit C the parts move from the position shown in Fig. 1 to the position shown in Fig. 2, wherewith each transverse arm T remains fixed with respect to the sub-frame and frame while the transverse arm $Ta$ has pivoted about its pivot point $24a$ on the transverse members 23, and in effect has moved with the body during the tilting movement of the latter.

It will be noted that during this tilting movement of the body and of the arm $Ta$, this arm has its pivot point with respect to the frame substantially in the line of the pivotal movement of the body with respect to the frame, so that the arm $Ta$ has not rocked about its pivot point $25a$, and therefore there has been no movement of the linkage $29a$ and the upper door $19a$ has been held closed during the tilting movement. On the contrary, the rocking movement of the body with respect to the frame and hence with respect to the transverse arm T has caused the linkage 29 to move with respect to the body, and hence the door 19 is opened by gravity, by the weight of the load against it, and by the pull of the link 29 until finally, when the body has reached a position as shown in Fig. 2, the door member is extended substantially in the line of the vehicle floor and forms a full chute for the material to be carried away from the wheels and deposited at a distance from them. It will be noted that the door guides the material away from the body so long as the material is dumping. It will of course be understood that when the power unit is again de-energized, and permitted to collapse, the body rocks downward by its own weight into the transport position in Fig. 1, during which movement the arms $Ta$ continue to hold the upper door $19a$ closed, while the transverse arms T exert a relative pressure downward through the links 29 upon the depending arms of the door 19 to close this door, so that when the various parts return to the position of Fig. 1, both doors 19, $19a$ are closed. This selected control of the door at the lowered side may of course be accomplished in other manners, but the particular illustration is set forth to show an operative system employable with the latches of the present invention.

If the lever 34 is in the central position denoted by B in Fig. 4, the latch rods 40 and $40^1$ are likewise in central position. The latch rod 40 is then engaged at its rear end in the depending lug 42 of the transverse arm T, and its pin 43 is engaged in the depending lug 42 of the front transverse arm T, while both pins 45 and 47 are free of the lug 48 on the main frame member 11. The latch rod $40^1$ is likewise engaged at its rear end in the depending lug $42^1$ of the rear transverse arm $Ta$, while its front pin $43^1$ is likewise engaged in the downwardly extending lug $42^1$ of the front transverse bar $Ta$; and likewise its pins $45^1$ and $47^1$ are free of the lug $48^1$ of the main frame member 11. It will thus be seen that all transverse bars T, $Ta$ are locked to the sub-frame members 22, while on the contrary the sub-frame members 22 are entirely free of the main frame 11 except at the pivot point 21. If the power unit C is now energized, it exerts an upward thrust upon the body, which now drags all transverse bars T, $Ta$ and the sub-frame 22 with it and the latter pivots about the point 21 at the rear of the frame, so that the body may now discharge at the rear, for example, through the rear door $19r$ which is pivoted at its top line $39r$. When the power unit C is again de-energized and permitted to collapse, the body, transverse arms and sub-frame return to their transport position.

When the lever 34 is in the position L of Fig. 4, the rod 40 is at its extreme right hand position, and the latch rod 40¹ is at its extreme left hand position. The latch rod 40 is then free at its rear from the downwardly extending lug 42 of the bar T, while the pin 43 at the front end is likewise free of the downwardly extending lug 42 of the front bar T: the pin 47 is, however, engaged in the lug 48 of the main frame member 11. The latch rod 40¹ at its rear end is engaged in the downwardly extending lug 42¹ of the rear transverse bar Ta; and at the front end the pin 43¹ is engaged in the downwardly extending lug 42¹ of the front transverse bar Ta; while the pin 45¹ is engaged in the lug 48¹ of the main frame 11. It will thus be seen that the sub-frame members 22 are connected to the main frame members 11 at the front by the lugs 48: that the transverse bars T are entirely free to rock on the sub-frame: and that the transverse bars Ta are locked to the sub-frame against rocking. When the power unit C is energized, the upward thrust upon the body causes a tilting movement toward the left, being the reverse position from that of Fig. 2, and dumping occurs automatically by a similar control of the lower door, in this case the door 19a. The return to the transport position occurs similarly with a positive closure of the door 19a.

It will be noted that in each case the latch rod 40 or 40¹ is guided in the members 41, 41¹, 41ʳ, 41ˢ, 41ᵗ, with respect to its movement into and out of the lugs 42, 42¹, 48, 48¹, so that there is substantially a shearing rather than a bending moment upon the respective rod which may therefore be of relatively small section since it performs a latching rather than a power transmitting element: and the same is true of the respective pins 43, 45, 47 and 43¹, 45¹, 47¹. It will particularly be noted that the power required to be transmitted through these members is only that of preventing the lifting of the respective portion of the sub-frame and transverse arms.

In the modified form of mechanism shown in Figs. 8 to 11, the structure is substantially the same as that already described, and in addition the body, sub-frame and frame are to be latched together respectively at the front, middle and rear.

In these figures the main frame 11, sub-frame members 22, brackets 20 and pivots 21 are the same as before, and guide members 41 are provided from point to point to control the longitudinal sliding movements of the respective rods 140, 140¹. The right hand side plates 41ʳ and 41ˢ co-operate as before with the downwardly extending apertured lugs 42 of respective transverse bars T at front and rear: while a further transverse bar T is disposed at the mid length of the body floor 17 and is likewise provided with an apertured lug 42 which extends downward between the side plates 141ʳ. The main frame 11 is likewise provided with an upwardly extending lug 48 which engages between the side plates 41ʳ: and also with an upwardly extending side lug 148 to engage between the side plates 141ʳ. On the left hand side of the vehicle, similarly, the side plates 141ᵗ and 41¹ are provided for the lugs 42¹ of the transverse members Ta while the central transverse member Ta has a lug 42¹ extending downwardly between the plates 141¹, which likewise receives the lug 148¹ of the main frame member 11.

The rod 140 at its rear end as before engages in the downwardly extending lug 42 of the rear transverse arm T. The front end of the latch rod 140 carries the bracket members 46 to support the pin 47; while the front end of the arm itself is rebent to form an end member 143 guided by a bracket 141 into and out of the upper apertures of the side plates 41ʳ. Intermediate the length of the latch rod 140 it is provided with a clamp 144 to support a pin 143ᵃ which is guided into and out of engagement in the upper apertures of the side plates 141ʳ and therewith the aperture of the lug 42. The latch rod 140 is likewise provided with a clamping member 146 to support the pin 147 for engagement into and out of the lower apertures of the side plates 141ʳ and the lug 148.

The left hand latch rod 140¹ at its rear end has a rebent portion 150¹ which is guided by a bracket 41 into and out of engagement with upper apertures in side plates 141ᵗ and therewith of the lug 42¹. At its front end this left hand latch rod 140¹ is provided with the clamp members 46¹ to support the pin 47¹ which engages into or out of the upper apertures in the side plates 41¹ and the lug 42¹ in opposition to the pin 43¹ mounted on a clamp 44¹ of the rod 140¹. This clamp also carries a pin 45¹. Intermediate its length the rod 140¹ carries a clamp member 146¹ to support a pin 147¹ which is engaged with the upper apertures of the side plates 141¹ and the corresponding lug 42¹. This rod 140¹ also has a clamp member 144¹ which carries the pin 145¹ and the pin 143¹. The rear end of the rod 140¹ is also provided with a clamp 151¹ to support a pin 152¹ in alinement with the rebent end 150¹ of the rod 140¹ itself.

Thus each of the sliding latch rods has a latching portion at one end and an offset latching pin at the other end extending parallel to said latching portion: all of said portions and pins on both rods extend in the same direction so that upon movement of the operating lever, one latch rod moves in one direction and the other latch rod in the other direction, and in this way, one latch rod releases its cooperating latch member while the other latch rod remains in or enters into engagement with its own latch members; and vice versa with a movement of the transverse shift lever in the other direction, an opposite latching is accomplished. In this way, the direction of permissive dumping of the body toward either side is controlled. Further, in an intermediate position of the transverse shift or control lever, all of the portions and pins remain engaged: so that no tilting movement of the body with respect to the sub-frame is possible: and therefore the sub-frame must tilt with respect to the main frame for a rearward dumping.

The operation of this modified form of construction is substantially the same as before. The lever 134 is movable back and forth in the slots 136 of the frame members 22, and in its movement cooperates with the clamps 46 and $46^1$ to cause the latch rods 140, $140^1$ to move simultaneously in opposite directions. When the lever is moved fully to the right hand position of Fig. 8, the rod 140 has moved to its extreme right hand position and the rod $140^1$ to its extreme left hand position. As before, the members 143, 143a and the rear end of the rod 140 are disengaged from the lugs 42: the pins 47, 147 are engaged with the lugs 48, 148. The left hand locking rod $140^1$ is in its extreme left hand position and the pins $152^1$, $143^1$, and $43^1$ are engaged in the lugs $42^1$, while the pins $145^1$ and $45^1$ hold the lugs $148^1$ and $48^1$. The sub-frame members 22 are thus locked to the main frame members 11 at both sides, and the latch rod $140^1$ at the left hand side holds the transverse arm Ta to the sub-frame, while the latch rod 140 at the right hand side permits the transverse arms T to move relatively to the sub-frame. When power is now applied relatively between the frame and the body, the transverse arms T are permitted to move, and the body tilts to the left hand side, i. e., the position opposite to that of Fig. 2.

When the lever 124 is in its central position, the parts are in the position shown in Figs. 8 and 9, in which the members 143, 143a and the end of the rod 140 itself engage the lugs 42, and the pins 47, 147 engage the lugs 48, 148. The latching rod $140^1$ engages the lugs $48^1$, $148^1$ by its pins $45^1$, $145^1$: while the remaining pins are free of the lugs $42^1$. When power is now applied between the body and the frame, the transverse arms T are locked to the sub-frame, and the sub-frame itself is locked to the body, while the transverse arms Ta are free to move with respect to the sub-frame so that as before the dumping body may tilt from the position of Fig. 1 to the position of Fig. 2. When the lever 134 is in the left hand position of Fig. 8, the latch rod 140 is in its extreme left hand position and the latch rod $140^1$ in its extreme right hand position. The rear end of the latch rod 140, and its pins 143 and 143a now engage the lugs 42 while the pins 47 and 147 are free of the lugs 48 and 148. At the same time, the latch rod $140^1$ engages its end $150^1$, and its pins $47^1$ and $147^1$ in the respective lugs $42^1$: while the pins $45^1$ and $145^1$ are free of the lugs $48^1$ and $148^1$. The transverse arms T, Ta and therewith the body proper are thus latched at both sides to the sub-frame members 22, while the latter is entirely free of the main frame members 11, and when power is applied the body will be tilted about the rear pivots 21.

It will thus be seen that by each of these constructions it is possible to employ a single power unit, and by the selective actuation of the latch system, to predetermine whether the body is to dump to the right, the left or to the rear, and this by the very simple movement of a lever between three predetermined positions which may be assured, for example, by the provision of notches in the bottom wall of the slot 136 of Fig. 8 or by the provision of a short plate 37 in Fig. 3, this plate extending slightly upward above the lower wall of the slot 36 and having a central notch as heretofore described for receiving the lever 34 and securing it in its selected position.

It is obvious that the invention is not limited to the embodiments disclosed, but that it may be applied in many ways within the scope of the appended claims.

I claim:

1. In a dump vehicle, a main frame, a sub-frame pivoted on said main frame to tilt in one direction, a dump body connected to said sub-frame to tilt in either of two directions at substantial angles to said first direction, fixed latch members connected to said main frame and said body, and cooperating movable latch members on said sub-frame adapted to latch said sub-frame to said main frame and to permit a selective tilting of said body in one of said respective latter directions while maintaining it against tilting in the other direction, said movable latches also cooperating with said fixed latch members on said body and said main frame to latch said body to said sub-frame and release the sub-frame from the main frame so that said sub-frame and body may tilt about its pivotal connection to the main frame for dumping in the first aforesaid direction.

2. In a dump vehicle, a main frame, a sub-frame pivoted to the main frame for dumping to the rear, a body having pivotal connections to said sub-frame, fixed latch members connected to said main frame and said body, and movable latch members on the sub-frame to cooperate with said fixed latch members, said latch members being adapted in one position to latch the body to the sub-frame and release the latch connection of said main frame and sub-frame so that the body and sub-frame may tilt for rearward dumping, and in other positions to latch the sub-frame to the main frame for lateral tilting of the body with respect to the sub-frame, for dumping to the respective sides.

3. In a dump vehicle, a main frame, a sub-frame pivoted to the main frame for dumping to the rear, a body having pivotal connections to said sub-frame, fixed latch members connected to said main frame and said body, and movable latch members on the sub-frame to cooperate with said fixed latch members, said latch members being adapted in one position to latch the body to the sub-frame and release the latch connection of said main frame and sub-frame so that the body and sub-frame may tilt for rearward dumping, and in other positions to latch the sub-frame to the main frame for lateral tilting of the body with respect to the sub-frame for dumping to the respective sides, said latch members cooperating in such latter other positions to prevent dumping in other than the selected direction.

4. In a dump vehicle, a main frame, a sub-frame pivotally mounted on said rear frame, a dump body having pivotal connections to said sub-frame for lateral dumping, said pivotal connections establishing fulcrums for the dump body spaced apart laterally from the longitudinal axis of the vehicle so that the dump body may rest on said fulcrums in stable equilibrium during normal transport, fixed latch members connected to said main frame and said body, sliding latch rods mounted on said sub-frame, means to move said latch rods simultaneously into a selected one of three positions, said latch rods in one of said positions cooperating with said fixed latch members to latch the sub-frame and main frame together and to hold said body against movement with respect to said sub-frame at one fulcrum thereof while permitting the tilting of the body about such fulcrum; said latch rods in a second position latching the main frame and sub-frame together and preventing the movement of the body with respect to the sub-frame at the other fulcrum, while permitting the free lateral tilting of the body about such fulcrum; said latch rods in the third position latching said body to said sub-frame while permitting the tilting of said sub-frame and body about said main frame for rearward dumping.

5. In a dump vehicle, a main frame, a sub-frame pivotally connected to said main frame adjacent the rear end thereof, transverse bars connected alternately at opposite sides of said sub-frame and extending across the same, a dump body connected to said transverse bars at the respective ends opposite said connection of the bars to the sub-frame, downwardly extending fixed latch members on said transverse bars and fixed latch members on said main frame, and movable latch members on said sub-frame located beneath said transverse bars and co-operating with said fixed latch members to latch said body, sub-frame and frame for dumping selectively to the rear and to either side.

6. In a dump vehicle, a main frame, a sub-frame pivoted to said main frame adjacent the rear thereof, transverse bars pivoted alternately at opposite sides of said sub-frame and extending thereacross, a dump body connected to said bars adjacent the ends thereof opposite the connection of said respective bars to said sub-frame, fixed latch members on said transverse bars and said main frame, movable latch members cooperating with said fixed latch members and adapted to assume any of three positions, said movable latch members in one of said positions latching the sub-frame and main frame together and holding said body against movement with respect to said sub-frame at one fulcrum thereof, while permitting the tilting of the body about such fulcrum, said latch members in a second position latching the main frame and sub-frame together and preventing the movement of the body with respect to the sub-frame at the other fulcrum, while permitting the free lateral tilting of the body about such fulcrum; said movable latch members in the third position latching said bars and body to said sub-frame while permitting the tilting of said sub-frame and body about said main frame for rearward dumping.

7. In a dump vehicle, a main frame, a sub-frame pivotally mounted on said main frame adjacent the rear thereof, a dump body adapted to tilt about spaced fulcrums at either side of said sub-frame for lateral dumping, upstanding lugs on said main frame, downwardly extending lugs connected to said body and in alinement with said upstanding lugs, spaced elements on the sub-frame to receive and guide said lugs, said lugs and elements having apertures therein in alinement in the normal transport position of the dump body upon the frame and sub-frame, and movable latch members adapted to be received selectively in said apertures, and means to selectively move said latch members into and out of said apertures whereby to select the direction of tilting.

8. In a dump vehicle, a main frame, a sub-frame pivotally mounted on said main frame adjacent the rear end thereof, a body connected to the sub-frame to tilt about lateral fulcrums for side dumping, fixed latch members connected to said main frame and said body, and sliding latch rods mounted on said sub-frame, and means to move said latch rods simultaneously in opposite directions, said latch rods cooperating with said latch members to selectively determine the direction of dumping.

9. In a dump vehicle, a main frame, a sub-frame pivotally mounted on said main frame adjacent the rear end thereof, a dump body connected to said sub-frame for lateral dumping about spaced fulcrums at either side of said sub-frame, fixed latch members connected to said main frame and said body adjacent the sides thereof, cooperating longitudinally movable latches on said sub-frame at either side thereof, an operating lever pivoted to said sub-frame substantially centrally thereof and extending across the same from one side to the other, and means for connecting the lever and the latches whereby said lever moves said latches simultaneously in opposite directions.

10. In a dump vehicle, a main frame, a sub-frame pivotally mounted on said main frame adjacent the rear end thereof, a dump body having connections to said sub-frame, said connections including transversely extending members connected alternately at opposite ends to said sub-frame and said body, latching devices mounted on and movable with said sub-frame to selectively latch said main frame to said sub-frame and said transverse members to said sub-frame, so that only one latching device is released at a time and the other latching devices prevent the dump body from tilting in two of three possible directions and it is thereby caused when raised to tilt in the remaining permitted direction.

11. In a dump vehicle, a frame, a body, means for connecting said body to said frame for tilting movement about laterally spaced fulcrums, and including fixed latch members connected to said body, fixed latch members connected to said frame, sliding latch rods and means to move said latch rods simultaneously in opposite directions for cooperative engagement and disengagement of said latch rods with said latch members to determine the direction of dumping, said latch rods in an intermediate position being engaged with all said latch members whereby to prevent movement of said body about either of said fulcrums.

12. In a dump vehicle, a frame, a body, means for connecting said body to said frame for tilting movement about laterally spaced fulcrums, fixed latch members connected to said body and fixed latch members connected to said frame, sliding latch rods at each side of the vehicle and each having one free end and a pin at the opposite end so that upon movement of said latch rod in the direction towards said pin both said free end and said pin will disengage said fixed latch members at the correpsonding side of the vehicle to release that side of the body for raising, both said rods having their free ends located at the same end of the vehicle, and means for simultaneously moving said latch rods in opposite directions whereby to release one side of the body for raising movement while holding the opposite side of the body latched to said frame.

In testimony whereof, I affix my signature.

HENRY FORT FLOWERS.